United States Patent [19]

Ragsdale

[11] 3,869,580

[45] Mar. 4, 1975

[54] APPARATUS FOR TESTING DATA MODEMS WHICH SIMULTANEOUSLY TRANSMIT AND RECEIVE FREQUENCY MULTIPLEXED SIGNALS

[75] Inventor: Robert Gordon Ragsdale, Hollywood, Calif.

[73] Assignee: Milgo Electronic Corporation, Miami, Fla.

[22] Filed: June 28, 1973

[21] Appl. No.: 374,695

Related U.S. Application Data

[63] Continuation of Ser. No. 198,876, Nov. 15, 1971, abandoned.

[52] U.S. Cl. .......................... 179/15 BF, 340/172.5

[51] Int. Cl. .............................................. H04j 3/12

[58] Field of Search ............... 179/15 BF; 340/175.2

[56] References Cited

UNITED STATES PATENTS 3,655,915 4/1972 Liberman ........................ 179/15 BF

*Primary Examiner*—Ralph D. Blakeslee

*Attorney, Agent, or Firm*—Jackson & Jones Law Corporation

[57] ABSTRACT

An apparatus for testing data modems of the type which simultaneously transmit and receive frequency multiplexed signals is disclosed. Data modems of this type include a transmitter with a digital data input circuit for transmitting a modulated carrier signal within a first frequency range over a transmission link such as a telephone line. The modem includes a receiver coupled in parallel with the transmitter to the telephone line for receiving a modulated carrier signal within a second frequency range, demodulating the signal and providing a digital output signal on a data output circuit.

The testing apparatus includes a test pattern generator coupled to the data input circuit of the modem for supplying a predetermined test pattern signal to the transmitter. A frequency translator circuit such as a balanced modulator is connected in the telephone line via a suitable hybrid coupling circuit for receiving the signal transmitted by the modem, translating the signal to the second frequency range and applying the translated signal to the telephone line. A bandpass filter is connected in series with the output circuit of the balanced modulator for removing unwanted signals such as harmonics from the translated signal. The testing apparatus further includes a test pattern analyzer coupled to the data output circuit of the modem for comparing the input and output signals to the modem to simultaneously check the performance of the transmitting and receiving portions of the modem.

4 Claims, 4 Drawing Figures

APPARATUS FOR TESTING DATA MODEMS WHICH SIMULTANEOUSLY TRANSMIT AND RECEIVE FREQUENCY MULTIPLEXED SIGNALS

CROSS-REFERENCE TO RELATED APPLICATIONS

This is a continuation of application Ser. No. 198,876, filed Nov. 15, 1971, now expressly abandoned in favor of this continuation application.

BACKGROUND OF THE INVENTION

1. Field of the Invention

This invention relates to an electronic testing apparatus and more particularly to an apparatus for testing of the performance of data modems which simultaneously transmit and receive data in separate frequency ranges over telephone lines.

2. Description of the Prior Art

Data modems, i.e., data modulator and demodulator units, which are arranged to transmit and receive data over telephone lines by means of frequency multiplexing are used extensively.

Data modems of this type include a transmitter for transmitting data such as teletype signals within a first frequency range, e.g., from 1,000 to 1,200 cycles, and a receiver for receiving such digital data within a second frequency range, e.g., 2,000 to 2,200 cycles. Typically, two such modems are connected together over a telephone line. A source of digital data may be connected to each transmitter for transmitting digital signals simultaneously between the two modems. The received signals are decoded and stored or otherwise utilized on the receiving end. To check the performance of such modems it has been necessary in the past to connect two modems via a telephone line and apply a digital test pattern to one or both modems and compare the received signal with the test pattern. Not only does the conventional testing procedure require the use of two modems but an error detected by the procedure cannot be traced to the faulty modem without additional testing.

I have discovered an apparatus which is capable of testing a frequency multiplexing modem without the necessity of utilizing a second modem.

SUMMARY OF THE INVENTION

An apparatus is provided for testing a data modem of the type which is adapted to receive digital data on the data input circuit thereof and transmitting a modulated carrier signal within a first frequency range over a transmission link representative of such input data. The modem simultaneously receives a modulated signal within a second frequency range over the link and provides a digital output signal representative of the received modulated signal on a data output circuit.

The testing apparatus includes means such as a test pattern generator for applying a predetermined data signal to the data input circuit of the modem. A translating circuit is coupled to the modem through a transmission link for receiving the transmitted signal, translating the signal to the second frequency range and applying the translated signal to the link. Means such as a test pattern analyzer is coupled to the data output circuit for comparing the input and output signals to thereby check the performance of the modem.

BRIEF DESCRIPTION OF THE DRAWINGS:

FIG. 4 is a combined block and circuit schematic of a hybrid coupling circuit which may be used in the circuit of FIG. 1.

DESCRIPTION OF THE PREFERRED EMBODIMENT

Figure 1:
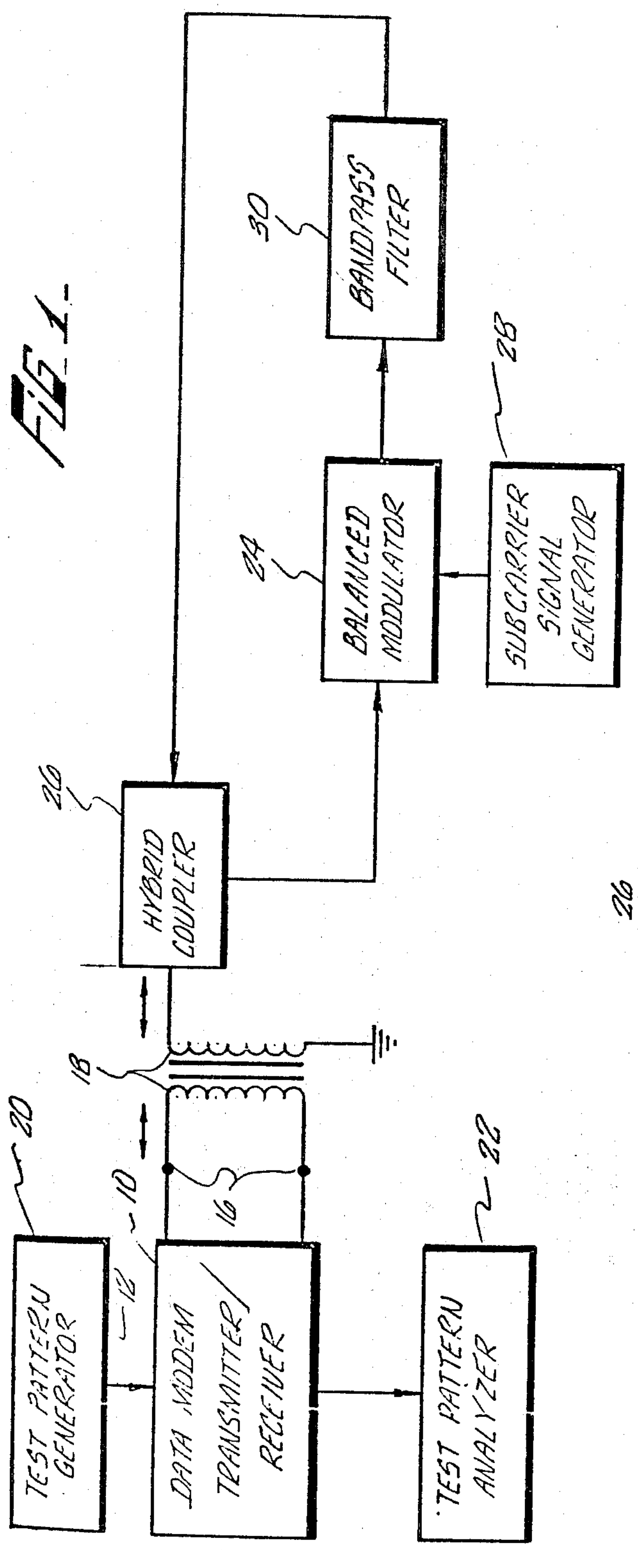
FIG. 1 is a combined block diagram and schematic circuit showing a testing apparatus in accordance with one embodiment of the present invention.

Referring now to the drawings, and particularly to FIG. 1, a data modem 10 is provided with a data input circuit 12, a data output circuit 14 and a pair of line terminals 16. The modem includes a transmitter and receiver which are coupled to a transmission link such as a conventional telephone line 18 via the line terminals 16. A test pattern generator 20 is connected to a data input circuit 12 for applying a predetermined digital test signal thereto. A test pattern analyzer 22 is connected to the data output circuit 14 for receiving and analyzing the output signal from the modem.

The modem 10 receives digital data via the data input circuit 12 and modulates a carrier signal within a first frequency range in accordance with the instantaneous value of the data input signal. For example, the modem may be of the frequency shift keying type in which the frequency of the carrier signal is shifted between two values to represent a space (binary zero) and mark (binary 1).

The test apparatus of the present invention is ideally suited for modems of the type marketed by Milgo Electronic Corporation in Miami, Fla., as the Modem 300. Such modems transmit a carrier signal which is frequency shifted within either of two frequency ranges, e.g., 1070–1270 $H_z$ and 2025–2225 $H_z$. The receiver is arranged to receive a modulated carrier within the frequency range which is not utilized by the transmitter. For example, the transmitter may send a modulated carrier within a first frequency range (1070–1270 $H_z$ or 2025–2225 $H_z$) to transmit 300 bits of digital data per second with the receiver receiving a modulated carrier within a second frequency (2025–2225 $H_z$ or 1070–1270 $H_z$ respectively). The received signal is demodulated in the receiver in a well-known manner to provide 300 bits of digital data per second in the digital output circuit 14.

A frequency translating circuit such as a balanced modulator 24 is connected to the telephone line 18 by a hybrid coupling circuit 26 for translating the signals transmitted by the modem 10 from the first frequency range to the second frequency range as will be described in more detail in connection with FIGS. 2 and 3. The balanced modulator is supplied with a sub-carrier signal from a sub-carrier signal generator 28. The sub-carrier signal is added to and subtracted from the received carrier signal. For example, the sub-carrier frequency may be 955 cycles per second to provide a signal at the output of the modulator 24 which varies from 115 to 315 $H_z$ and 2025 to 2225 $H_z$ for an input transmitted signal within the range of 1070–1270 $H_z$. An input signal within the range of 2025–2225 $H_z$ will appear at the output of the modulator 24 as a signal which varies from 1070–1270 $H_z$ and 2980–3180 $H_z$. A bandpass filter 30 is connected in the output of the modulator 24 for blocking signals which are outside of the frequency range (e.g. 1070–2225 $H_z$) of the signals transmitted and received by the modem. For example, the filter may have a passband from 500–2500 $H_z$.

The testing apparatus of FIG. 1 receives a modulated carrier signal from the data modem 10 within a first frequency range (1070–1270 $H_z$ or 2025–2225 $H_z$), translates the received signals to the second frequency range (2025–2225 $H_z$ or 1070–1270 $H_z$, respectively) and reapplies the translated signal to the line 18. Thus, a digital test pattern is applied to the modem input circuit 12 transmitted over a telephone line and returned to the receiver where it is demodulated. The demodulated signal is analyzed by the analyzer 22 and compared with the test pattern to determine the error rate between the transmitted and received signals.

Balanced modulators for translating signals from one frequency range to another are well known in the art. Such modulators compare the input signal with a locally generated sine or cosine wave sub-carrier signal to provide the sum and difference of such signals in the output circuit. I have discovered a digitally controlled balanced modulator system which is particularly useful in the testing apparatus of FIG. 1. Such a modulator is described in more detail in my copending application Ser. No. 198,843, filed Nov. 15, 1971, now abandoned. One embodiment of such a modulator system is illustrated in FIG. 2 and utilizes digitally controlled variable resistance to control the gain of a differential amplifier in a simulated cosine function.

Figure 2:
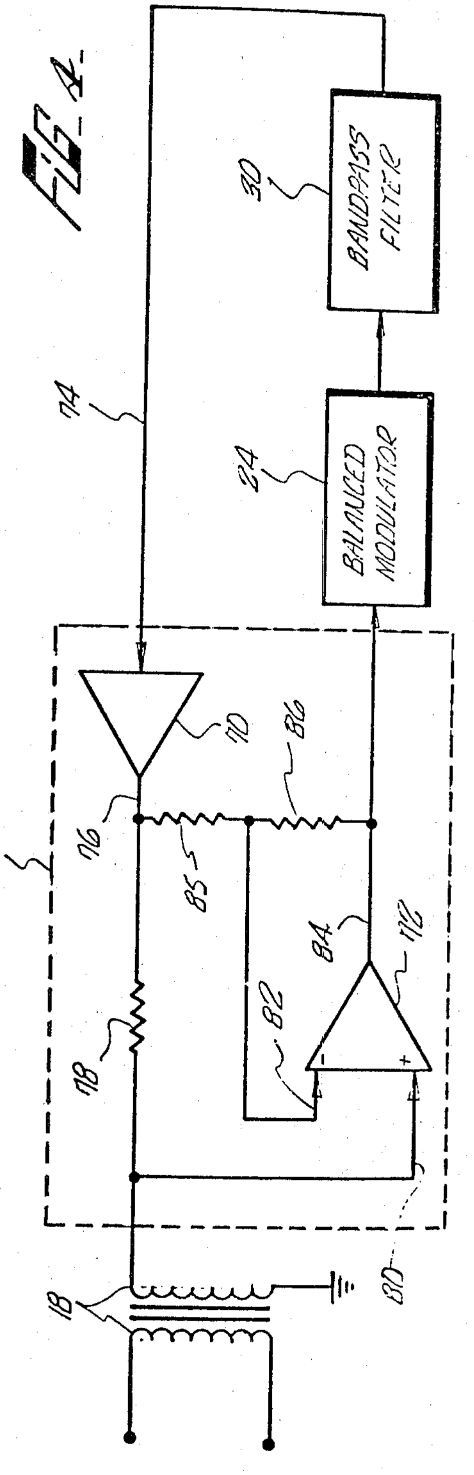
FIG. 2 is a combined block and circuit schematic of a balanced modulator which may be used in the circuit of FIG. 1.

Referring now to FIG. 2, a digitally controlled balanced modulator system is illustrated which includes a pair of input resistors 40 and 42 connected between an input circuit 44 of the modulator and a pair of input circuits 45 and 46 of a differential amplifier 47. A feedback resistor 48 is connected between an output circuit 49 of the modulator and the amplifier input circuit 46. A resistor 50 is connected between the input circuit 46 and ground. A group of weighted resistors 52–56 are connected between the amplifier input circuit 46 and ground via switches 62-66. The output voltage of the modulator $E_o$ is equal to $E_{in} \times \text{Cos.}\Theta$, where the value of the resistance connected between the input 46 and ground is equal to $\frac{1}{3}R_F/(1 + \text{Cos.}\Theta)$. To provide an output signal which follows a cosine function multiplied by the modulating signal $E_{in}$, the switches 62–66 are closed and opened sequentially by switch control 68 to increase and then decrease the total resistance between the input circuit 46 and ground as is described in more detail in the description of FIG. 3.

Figures 2, 3:
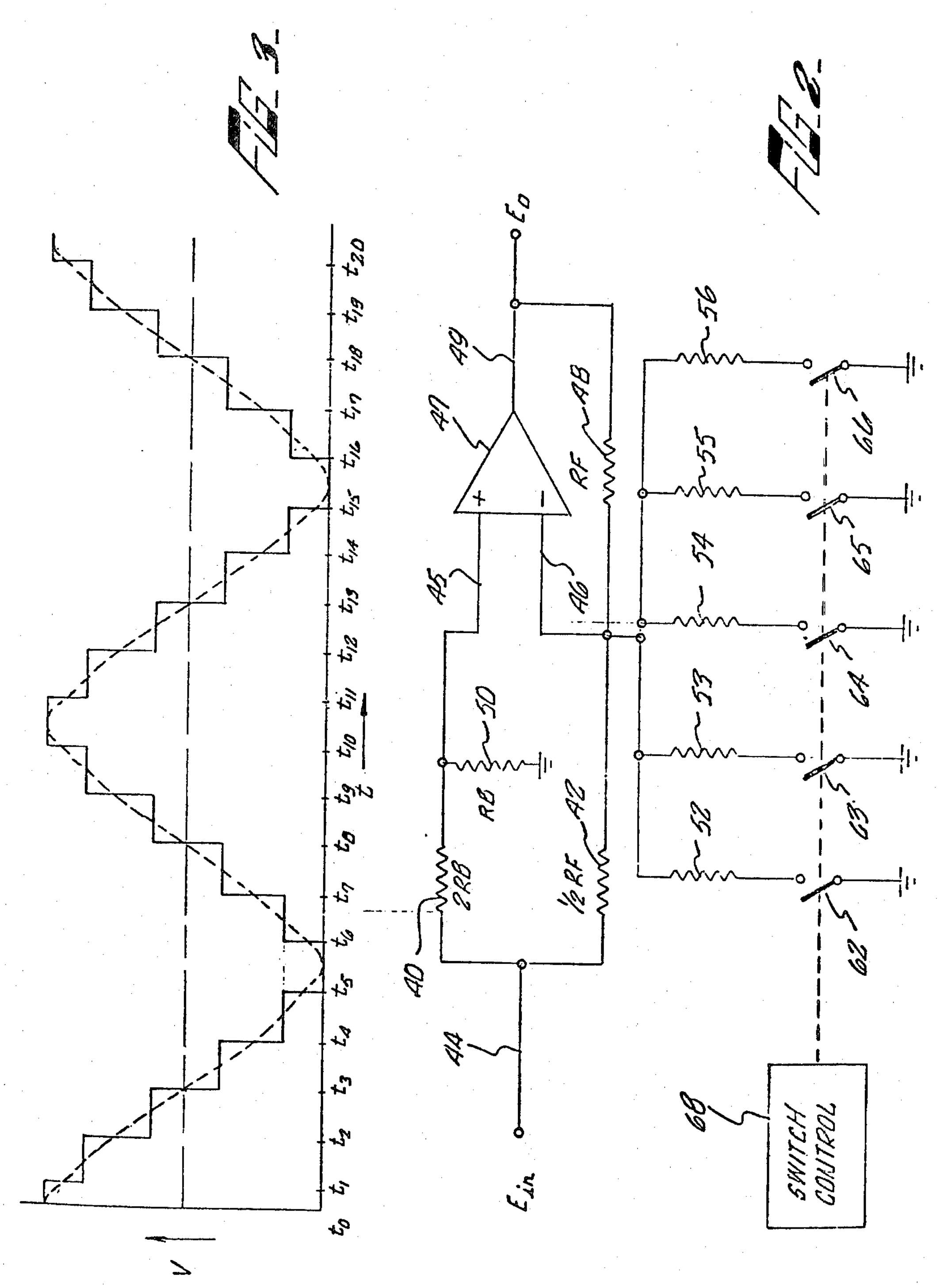
FIG. 3 depicts an output wave form from the modulator of FIG. 2.

Referring now to FIG. 3 wherein the ordinate represents the output voltage $E_o$ (with a constant input signal $E_{in}$) and the abscissa represents time. FIG. 3 illustrates a simulated cosine wave which represents an inverse value of the resistance between the input circuit 46 and ground and, thus, represents the gain of the amplifier 47. The gain is caused to follow the simulated cosine function by the sequential opening and closing of the switches 62–66 at times $T_o - T_{20}$. At time $T_o$, the resistance between the input circuit 46 and ground is at a maximum and all of the switches 62-66 are open. At time $T_1$ switch 62 is closed by the switch control 68. Switches 63, 64, 65 and 66 are closed, at times $T_2$, $T_3$, $T_4$ and $T_5$, respectively. From $T_5$ to $T_6$ all of the switches are closed and the resistance between the input circuit 46 and ground is at a minimum. At time $T_6$ switch 66 is opened by control 68 and switches 65, 64, 63, 62 are opened, respectively at times $T_7$, $T_8$, $T_9$ and $T_{10}$. This sequence is repeated to vary the resistance between input circuit 46 and ground in an inverse cosine function. The gain of the amplifier 47, thus, follows a cosine function. The output signal $E_o$ includes the sum and difference of the transmitted modulated carrier signal applied to the input circuit 44 and the signal represented by the cosine wave of FIG. 3. The output signal from the modulator further includes harmonic signals equal to $n \times$ (the sampling frequency) plus and minus the fundamental or sub-carrier frequency where $n$ is equal to 1, 2, 3 . . . and the sampling frequency is equal to the frequency of the switching steps of switches 62–66, [i.e., 10 × the sub-carrier frequency.]

Where the sampling frequency is equal to 10 times the sub-carrier frequency as in the circuit of FIG. 2, the output signal $E_o = E_{in}$ [Cos. $\omega$t + 1/9 Cos. 9$\omega$t + 1/11 Cos. 11$\omega$t + 1/19 Cos. 19$\omega$t + 1/21 Cos. 21$\omega$t . . .]. Using a sample frequency of 10 times the desired sub-carrier frequency requires only five switches and removes substantially all of the troublesome harmonic signal that would otherwise be present. It should be understood that a sample frequency of 6, 8, 12, etc. times the desired sub-carrier frequency may be readily obtained if desired for a particular application by providing the proper number of switches and corresponding weighted resistors in the circuit of FIG. 2.

Referring now to FIG. 4, there is illustrated a hybrid coupling circuit for use in the testing apparatus of FIG. 1. The hybrid coupling circuit isolates the output signal from the bandpass filter 30 from the input circuit to the balanced modulator 24. This circuit includes a transmitting amplifier 70 and a receiving amplifier 72. The transmitting amplifier 70 is illustrated as having one input circuit 74 connected to the output of the bandpass filter and an output circuit 76 coupled to the transmission line 18 through a resistor 78. The receiving amplifier 72 includes a pair of input circuits 80, 82 and an output circuit 84. A pair of voltage divider resistors 85 and 86 are connected between the output circuits of the amplifier 70 and 72. The input circuit 80 of the receiving amplifier is connected directly to the transmission line 18 and the other input circuit 82 is connected to the junction of the voltage divider resistors 85 and 86. Resistor 78 preferably has a value of 600 Ohms to match the line impedance. Resistors 85 and 86 may have a value of 10,000 Ohms each. Such a hybrid coupling circuit balances out the output signal from the transmitting amplifier 70 on the input circuits of the differential amplifier 72 so that the output signal of the amplifier 72 will be zero in response to the output signal from the amplifier 70.

An apparatus for simultaneously testing the transmitter and receiver of a data modem has been described. Although only one embodiment has been described, it will be apparent to those skilled in the art that others may be constructed.

What is claimed is:

1. In an apparatus for testing a data modem wherein the modem includes a transmitter portion for receiving digital data on a data input circuit, modulating a carrier signal in response to the data and transmitting the modulated carrier signal within one of two selectable frequency ranges over a telephone line and a receiver portion for simultaneously receiving from a telephone line a modulated carrier signal within the other frequency range not then being utilized by the transmitter, demodulating the received signal to derive digital data and producing a digital output signal on a data output circuit, the testing apparatus being separate from the modem per se and comprising:

means for applying a predetermined data signal on the data input circuit;

frequency translating means independent of the data modem and coupled to the data modem through at least one telephone line for receiving the transmitted signal at either one of the two selected frequency ranges and automatically translating the signal to the other frequency range;

means for applying the translated signal at said other frequency range to the telephone line for transmission to the receiver portion of the modem; and means coupled to the data output circuit of the data modem for comparing the input and output signals to check the performance of the modem operating over said telephone line.

2. The combination as defined in claim 1 wherein the frequency translating means includes a balanced modulator and a sub-carrier signal generator, the frequency of the sub-carrier signal being equal to the difference between the two selectable frequency ranges.

3. The combination as defined in claim 2 wherein the frequency translating means further includes a bandpass filter for removing signals from the modulator output which are above and below the upper and lower frequencies, respectively, of the two selectable frequency ranges.

4. The combination as defined in claim 3 including a hybrid coupling circuit for connecting the frequency translating means to the telephone line, the coupling circuit being arranged to isolate the signal received by the frequency translating means from the output thereof.

* * * * *